(12) United States Patent
Miyata

(10) Patent No.: US 9,373,877 B2
(45) Date of Patent: Jun. 21, 2016

(54) COMMUNICATION SHEET, SMART SHELF

(71) Applicant: Akira Miyata, Tokyo (JP)

(72) Inventor: Akira Miyata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 52 days.

(21) Appl. No.: 14/362,165

(22) PCT Filed: Nov. 22, 2012

(86) PCT No.: PCT/JP2012/007543
§ 371 (c)(1),
(2) Date: Jun. 2, 2014

(87) PCT Pub. No.: WO2013/080507
PCT Pub. Date: Jun. 6, 2013

(65) Prior Publication Data
US 2014/0340179 A1 Nov. 20, 2014

(30) Foreign Application Priority Data
Dec. 2, 2011 (JP) .................................. 2011-265156

(51) Int. Cl.
*H01P 3/02* (2006.01)
*H04B 13/00* (2006.01)
*H01Q 15/14* (2006.01)
*H01Q 1/22* (2006.01)
*G06K 19/077* (2006.01)
*G06K 17/00* (2006.01)

(52) U.S. Cl.
CPC .............. *H01P 3/02* (2013.01); *G06K 19/0772* (2013.01); *H01Q 1/2208* (2013.01); *H01Q 15/14* (2013.01); *H04B 13/00* (2013.01)

(58) Field of Classification Search
CPC ............... H01P 5/00; H01P 3/08; H05K 5/00; H05K 7/186; G06K 7/10366
USPC .................. 333/24 R, 236; 340/572.1, 572.9
See application file for complete search history.

(56) References Cited

U.S. PATENT DOCUMENTS

| 7,626,561 B2 * | 12/2009 | Shinoda | ............... H04B 5/0018 343/897 |
| 2003/0174099 A1 * | 9/2003 | Bauer | .................. G06K 7/0008 343/893 |

(Continued)

FOREIGN PATENT DOCUMENTS

| JP | 2007-281678 A | 10/2007 |
| JP | 2009-105598 A | 5/2009 |

(Continued)

OTHER PUBLICATIONS

International Search Report for PCT Application No. PCT/JP2012/007543, mailed on Jan. 29, 2013.

*Primary Examiner* — Dean Takaoka

(57) ABSTRACT

The communication sheet according to the present invention includes a dielectric layer including a dielectric substrate, a first conductor layer that is a conductor layer including a mesh sheet-like mesh conductor disposed on one surface of the dielectric substrate, wherein an opening region from where the mesh conductor is removed is formed, and a second conductor layer that is a conductor layer including a sheet-like sheet conductor disposed on another surface of the dielectric substrate opposite to the first conductor layer, wherein the sheet conductor in a region opposite to the opening region from where the mesh conductor is removed is not removed.

6 Claims, 19 Drawing Sheets

(56) References Cited

U.S. PATENT DOCUMENTS

| | | | |
|---|---|---|---|
| 2004/0224135 A1* | 11/2004 | Krebs | G06K 7/0008 428/195.1 |
| 2011/0221547 A1* | 9/2011 | Tezuka | G06K 7/10316 333/236 |
| 2012/0012655 A1* | 1/2012 | Kai | H01Q 1/2216 235/439 |

FOREIGN PATENT DOCUMENTS

| | | |
|---|---|---|
| JP | 2009-105599 A | 5/2009 |
| JP | 2009-105600 A | 5/2009 |
| JP | 2010-56952 A | 3/2010 |
| JP | 2010-114696 A | 5/2010 |
| WO | 2007/032049 A1 | 3/2007 |
| WO | 2007/066447 A1 | 6/2007 |

* cited by examiner

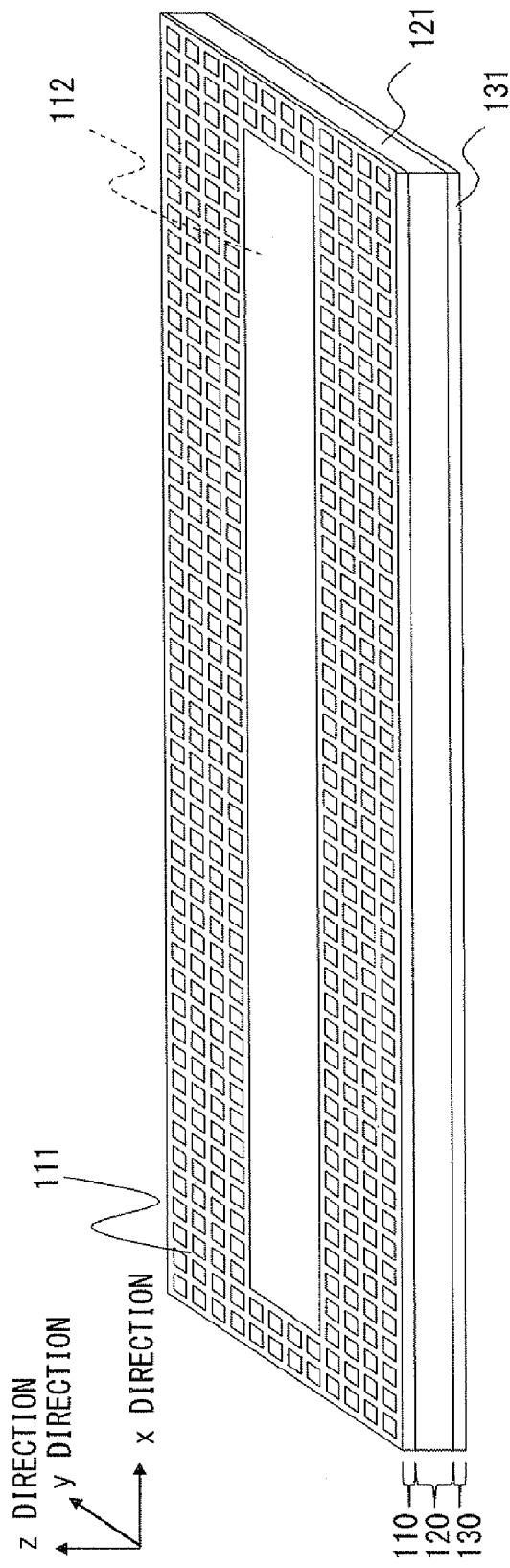

ELECTRIC FIELD COMPONENT Ez IN z DIRECTION IN PERIPHERY OF COMMUNICATION SHEET z DIRECTION (DIRECTION PERPENDICULAR TO COMMUNICATION SHEET)

y DIRECTION (DIRECTION PERPENDICULAR TO ELECTROMAGNETIC WAVE TRAVELING DIRECTION)

y DIRECTION
(DIRECTION PERPENDICULAR TO ELECTROMAGNETIC WAVE TRAVELING DIRECTION)

z DIRECTION
(DIRECTION PERPENDICULAR TO COMMUNICATION SHEET)

ELECTRIC FIELD COMPONENT Ey IN y DIRECTION IN PERIPHERY OF COMMUNICATION SHEET

ELECTRIC FIELD COMPONENT Ez IN z DIRECTION IN PERIPHERY OF COMMUNICATION SHEET y DIRECTION (DIRECTION PERPENDICULAR TO ELECTROMAGNETIC WAVE TRAVELING DIRECTION)

z DIRECTION (DIRECTION PERPENDICULAR TO COMMUNICATION SHEET)

y DIRECTION
(DIRECTION PERPENDICULAR TO ELECTROMAGNETIC WAVE TRAVELING DIRECTION)

z DIRECTION
(DIRECTION PERPENDICULAR TO COMMUNICATION SHEET)

ELECTRIC FIELD COMPONENT Ey IN y DIRECTION IN PERIPHERY OF COMMUNICATION SHEET z DIRECTION (DIRECTION PERPENDICULAR TO COMMUNICATION SHEET)

y DIRECTION (DIRECTION PERPENDICULAR TO ELECTROMAGNETIC WAVE TRAVELING DIRECTION)

ELECTRIC FIELD COMPONENT Ez IN z DIRECTION IN PERIPHERY OF COMMUNICATION SHEET y DIRECTION (DIRECTION PERPENDICULAR TO ELECTROMAGNETIC WAVE TRAVELING DIRECTION)

z DIRECTION (DIRECTION PERPENDICULAR TO COMMUNICATION SHEET)

ELECTRIC FIELD COMPONENT Ey IN y DIRECTION IN PERIPHERY OF COMMUNICATION SHEET

COMMUNICATION SHEET, SMART SHELF

This application is a National Stage Entry of PCT/JP2012/007543 filed on Nov. 22, 2012, which claims priority from Japanese Application 2011-265156 filed on Dec. 2, 2011, the contents of all of which are incorporated herein by reference, in their entirety.

TECHNICAL FIELD

The present invention relates to a communication sheet and a smart shelf using the communication sheet and, in particular, to a communication sheet whose polarization characteristic has been improved.

BACKGROUND ART

In recent years, the development of a communication sheet that makes an electromagnetic wave travel using an interspace region sandwiched by a mesh-like conductor layer and a sheet-like conductor layer as a transmission path, and combines the electromagnetic wave with an electromagnetic wave in a leaching region leaked from the mesh-like conductor layer, thereby allowing for communication between devices (for example, Patent Literature 1), has been advanced.

As a utilization mode of such communication sheet, various applications that take advantage of features of the two-dimensionality of the communication sheet have been examined. For example, such a utilization mode has been considered where a communication sheet is arranged on a top board, such as a desk, and an information processing terminal, such as a personal computer, placed on the communication sheet performs communication through the communication sheet.

In this case, planarity is required for the communication sheet itself so as not to make the doing of general work at the desk inconvenient. Consequently, Patent Literature 2 to 4 disclose a method for arranging a communication interface device in accordance with a notch or an opening portion of a top board that has the notch and an opening, and supplying an electromagnetic wave to the communication sheet from below.

The communication sheet disclosed in Patent Literature 2 to 4 has a configuration provided with a mesh conductor surface at a lower side of a partial region of the communication sheet so as to be able to connect to the downwardly arranged communication interface device. As such communication sheet, a configuration is disclosed in which, for example, the communication sheet is cut so as to provide an opening in a center thereof, a cut portion is fitted in a remaining portion inside out, and thereby the mesh conductor surface is arranged at a lower side in the center. In addition, a configuration is disclosed in which an end of the communication sheet is cut in a notch shape, a cut portion is fitted in a remaining portion inside out, and thereby the mesh conductor surface is arranged at a lower side in the sheet end.

In addition, as the other utilization mode of the communication sheet, Patent Literature 5 discloses an RFID tag system that manages by a management device book etc. to which RFID (radio identification) tags have been attached using an electromagnetic wave transmission sheet (a communication sheet). The electromagnetic wave transmission sheet of Patent Literature 5 is set to be in a resonant condition by setting a length of a width perpendicular to a traveling direction of an electromagnetic wave to be transmitted as a length substantially equal to natural number times as long as a half-wave length of the electromagnetic wave to be transmitted, and thus reduction of leaked radio waves is achieved. Transmission and reception of a signal and power supply to the electromagnetic wave transmission sheet are performed through an interface arranged at one shorter side of the electromagnetic wave transmission sheet, or an interface arranged at a through hole provided inside of the electromagnetic wave transmission sheet. According to the electromagnetic wave transmission sheet, an electromagnetic wave utilization efficiency can be improved compared with a configuration in which an electromagnetic wave absorbing member for preventing electromagnetic wave leakage etc. is arranged at a sheet end.

In addition to this, Patent Literature 6 discloses a technology to configure an electromagnetic wave transmission medium system by mutually connecting and combining a plurality of electromagnetic wave transmission media in order to reduce a weight of an electromagnetic wave transmission medium (a communication sheet) having a large area and to facilitate the conveyance thereof. Here, as methods for connecting the plurality of electromagnetic wave transmission media, are disclosed a method for connecting one electromagnetic wave transmission medium and the other electromagnetic wave transmission medium by a pair of conductor plates that covers them so as to sandwich them from the front and the back, and a method for hollowing a part of one electromagnetic wave transmission medium, and fitting the other electromagnetic wave transmission medium in the hollowed part to thereby connect them.

CITATION LIST

Patent Literature

Patent Literature 1: International Patent Publication No. WO2007/032049
Patent Literature 2: Japanese Unexamined Patent Application Publication No. 2009-105598
Patent Literature 3: Japanese Unexamined Patent Application Publication No. 2009-105599
Patent Literature 4: Japanese Unexamined Patent Application Publication No. 2009-105600
Patent Literature 5: Japanese Unexamined Patent Application Publication No. 2010-114696
Patent Literature 6: Japanese Unexamined Patent Application Publication No. 2010-56952

SUMMARY OF INVENTION

Technical Problem

When an RFID tag system is constructed using a communication sheet as in Patent Literature 5, a polarization characteristic of an RFID tag may pose a problem.
Namely, since it is inevitably required that the sizes of RFID tags attached to documents etc. be reduced due to their applications, restrictions are imposed on a shape of an antenna, etc. As a result of this, modes, such as circular polarization and elliptical polarization, cannot be used, and the polarization characteristic serves as a mode near linear polarization.
Here, in the communication sheet of Patent Literature 5, as shown in FIGS. 15A and 15B, while an electric field component $E_z$ in a direction (z direction) perpendicular to the communication sheet substantially uniformly extends above the communication sheet, an electric field component $E_y$ in a direction (y direction) perpendicular to the traveling direction of the electromagnetic wave is null above a center of the communication sheet.

Accordingly, although an RFID tag can be recognized if a polarization direction of the RFID tag located above the center of the communication sheet is the z direction, there is a problem that a recognition rate of the RFID tag rapidly decreases when a direction of the RFID tag is deviated from the z direction. Accordingly, there has been a problem that an attachment direction of the RFID tag is limited, thus causing use thereof to be very inconvenient, and a problem that the RFID tag cannot be recognized if a direction thereof is deviated for some reason.

In view of the above-described problems, the present invention aims at providing a communication sheet whose polarization characteristic has been improved and a smart shelf utilizing the communication sheet, the communication sheet changing an electromagnetic field and transmitting a signal in an interspace region sandwiched by a mesh sheet-like conductor layer and a sheet-like conductor layer and a leaching region outside the mesh-like conductor layer.

Solution to Problem

A communication sheet according to an exemplary aspect of the invention includes: a dielectric layer including a dielectric substrate; a first conductor layer that is a conductor layer including a mesh sheet-like mesh conductor disposed on one surface of the dielectric substrate, wherein an opening region from where the mesh conductor is removed is formed; and a second conductor layer that is a conductor layer including a sheet-like sheet conductor disposed on another surface of the dielectric substrate opposite to the first conductor layer, wherein the sheet conductor in a region opposite to the opening region from where the mesh conductor is removed is not removed.

A smart shelf according to an exemplary aspect of the invention includes a communication sheet which includes: a dielectric layer including a dielectric substrate; a first conductor layer that is a conductor layer including a mesh sheet-like mesh conductor disposed on one surface of the dielectric substrate, wherein an opening region from where the mesh conductor is removed is formed; and a second conductor layer that is a conductor layer including a sheet-like sheet conductor disposed on another surface of the dielectric substrate opposite to the first conductor layer, wherein the sheet conductor in a region opposite to the opening region from where the mesh conductor is removed is not removed.

Advantageous Effects of Invention

According to the present invention, a communication sheet whose polarization characteristic has been improved and a smart shelf utilizing the communication sheet can be provided, the communication sheet changing an electromagnetic field and transmitting a signal in an interspace region sandwiched by a mesh-like conductor layer and a sheet-like conductor layer and a leaching region outside the mesh-like conductor layer.

BRIEF DESCRIPTION OF DRAWINGS

FIG. 1 is an external view of a communication sheet pertaining to an embodiment 1.

DESCRIPTION OF EMBODIMENTS

Hereinafter, an embodiment of the present invention will be explained with reference to drawings. The following explanation shows a preferred embodiment of the present invention, and the scope of the present invention is not limited to the following embodiment. In the following explanation, components to which the same symbol is given have a substantially similar content.

Embodiment 1

Figure 2A:
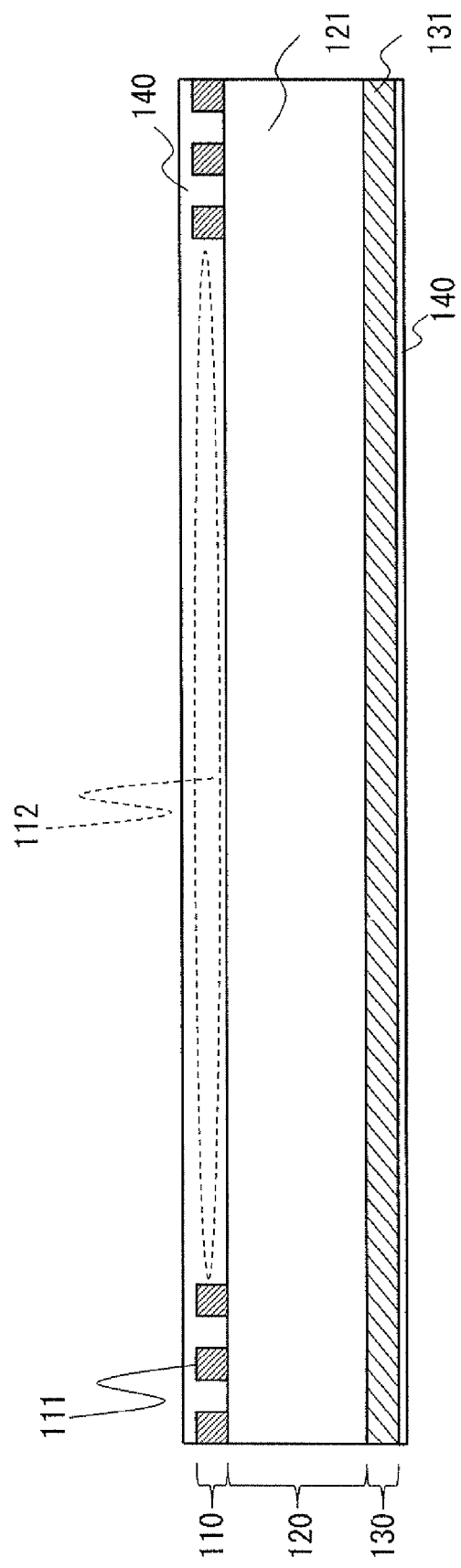
FIG. 2A is an xz cross-sectional view of a center portion of the communication sheet pertaining to the embodiment 1.
Figure 2B:
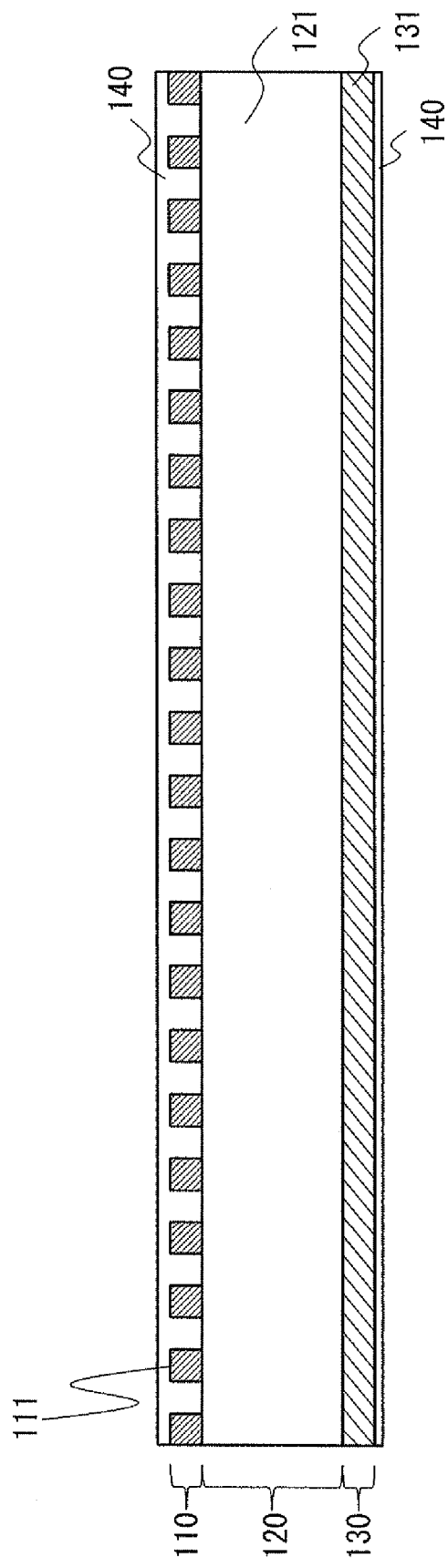
FIG. 2B is an xz cross-sectional view of a peripheral portion of the communication sheet pertaining to the embodiment 1.

Hereinafter, an embodiment 1 of the present invention will be explained with reference to the drawings. FIG. 1 is an external view of a communication sheet 100 pertaining to the embodiment 1. In addition, FIG. 2A is an xz cross-sectional view near a sheet center in a y direction of the communication sheet 100, and FIG. 2B is the xz cross-sectional view near a sheet end in the y direction of the communication sheet 100.

Here, a traveling direction of an electromagnetic wave in the communication sheet 100 is defined as an x direction, a direction perpendicular to the traveling direction of the electromagnetic wave in the communication sheet 100 is a y direction, and a direction perpendicular to the communication sheet 100 is a z direction, respectively. The communication sheet 100 is a thin sheet having a rectangular shape, an electromagnetic wave for communication being supplied from an interface device installed in a short-side direction of the sheet, and the electromagnetic wave travelling along a longitudinal direction of the sheet. Accordingly, the longitudinal direction of the communication sheet 100 corresponds to the x direction, and the short-side direction thereof corresponds to the y direction. In the following explanation, the short-side direction, i.e., the y direction, may be called a sheet width direction, and a length in the short-side direction of the communication sheet may be called a sheet width.

The communication sheet 100 is configured to have three stacked layers, a first conductor layer 110, a dielectric layer 120, and a second conductor layer 130. The dielectric layer 120 is the layer that serves as a substrate, and through which an electromagnetic wave propagates. The first conductor layer 110 is formed at one surface of a dielectric substrate 121 included in the dielectric layer 120, and the second conductor layer 130 is formed at the other surface of the dielectric substrate opposed to the first conductor layer 110, whereby an electromagnetic wave travels through the dielectric layer, which is an interspace region sandwiched by the two conductor layers, in a state where a part of the electromagnetic wave leaches from the first conductor layer 110. The first conductor layer 110 and the second conductor layer 130 are covered with a protective film 140, which is an insulator, respectively. It is to be noted that a protective film is appropriately omitted in each of the following drawings.

Each layer has substantially the same belt-like rectangular shape that has substantially the same sheet width, respectively. However, a part of an inside of the first conductor layer 110 is removed, and thereby an opening region is provided. A mesh sheet-like conductor in which an opening region 112 has been provided is arranged as the first conductor layer 110 at one surface of the sheet-like dielectric substrate 121 having a rectangular shape, and a sheet-like conductor is arranged at an opposed one surface as the second conductor layer 130. As a size of the communication sheet 100, for example, a length in the short-side direction can be set as several to tens of centimeters, and a length in the longitudinal direction can be set as tens of centimeters to several meters. However, the above shape and the size of the communication sheet 100 are just one example of the shape and size thereof, and the present invention is not limited to this.

Here, it is desirable that the length (sheet width) in the short-side direction of the dielectric substrate 121 (communication sheet 100) be set as a length not less than ⅓ and not greater than ½ of an effective wavelength λ of an electromagnetic wave for communication that travels inside the dielectric substrate. When the sheet width of the dielectric substrate 121 exceeds a half-wave length of the effective wavelength λ of the above-described electromagnetic wave, unevenness begins to occur in the electric field component Ez that serves as a main mode of communication. Accordingly, even if the RFID tag is properly installed so that received polarization thereof becomes perpendicular to the communication sheet, deterioration of communication accuracy occurs. It is to be noted that the effective wavelength λ of the electromagnetic wave described herein is the length obtained by adding an effective dielectric constant of a dielectric included in the dielectric substrate 121 to a wavelength $\lambda_0$ of the electromagnetic wave that propagates through a free space.

Next, each layer included in the communication sheet 100 will be explained in detail.

The first conductor layer 110 is a mesh sheet-like conductor, and is the conductor layer in which mesh conductors 111 of a predetermined region have been removed and thus the opening region 112 has been provided. Here, "sheet-like" means a state of having an extent as a surface and having a thin thickness. In addition, "mesh sheet-like" refers to a state where mesh conductors are two-dimensionally arranged at a predetermined mesh period extending as a surface. The "mesh conductors" are the conductors included in a mesh sheet.

Since the first conductor layer 110 is formed of the mesh sheet-like conductor, and thereby a part of the electromagnetic wave propagates leaching from the mesh conductors 111, an electromagnetic wave leaching region is formed above the first conductor layer 110.

The mesh sheet-like conductor can be formed by periodically making a small opening in one sheet-like conductor. A size of the opening included in the mesh sheet should be sufficiently smaller as compared with the above-described opening region 112. It is preferable that a mesh period of the mesh sheet of the first conductor layer 110 be set as a sufficiently smaller length as compared with the effective wavelength λ of the electromagnetic wave that propagates through the interspace region between the first conductor layer 110 and the second conductor layer 130, which are two conductive sheets opposed to each other. Specifically, the mesh sheet of the first conductor layer 110 can have a mesh structure of a mesh period interval of several millimeters to several centimeters, as one example.

It is to be noted that when an electromagnetic wave of a 900 MHz band is used as an electromagnetic wave for communication, the wavelength $\lambda_0$ in the free space is approximately 33.3 cm. Here, the effective wavelength of the electromagnetic wave that travels the dielectric substrate, which is the interspace region between the first conductor layer 110 and the second conductor layer 130, becomes shorter as compared with $\lambda_0$, since the effective dielectric constant is added thereto. In order to efficiently trap the electromagnetic wave in the interspace region, the mesh period is desirably set to be a length not greater than 1/10 of the effective wavelength λ.

Here, in the first conductor layer 110, the mesh conductor 111 of the predetermined region is removed from the mesh sheet in which the above-described mesh conductors have been two-dimensionally arrayed. A region where the mesh conductors have been removed is defined as the opening region 112. In the opening region 112, the mesh conductors of a region larger than the above-described mesh period have been removed to form an opening state.

The dielectric layer 120 includes the dielectric substrate 121, which is a sheet-like dielectric, and is located between the first conductor layer 110 and the second conductor layer 130. An electromagnetic wave supplied from outside through an interface for communication propagates through the dielectric layer 120, which is the interspace region between the first conductor layer 110 and the second conductor layer 130, in a state where a part of the electromagnetic wave has leached above the first conductor layer 110. As the dielectric substrate 121, sheet-like resin, rubber, foam, a gel material, etc. can be used.

The second conductor layer 130 is a sheet-like conductor arranged in a state in which it is opposed to and substantially parallel to the first conductor layer 110. The second conductor layer 130 is a so-called conductive sheet, and includes metal with a thin thickness, etc. Here, the sheet conductors in a portion opposed to a portion from which the mesh conductors have been removed in the first conductor layer 110 have not been removed from the second conductor layer 130.

Next, a function of the above-described opening region 112 provided in the mesh sheet-like conductor of the first conductor layer 110 will be explained in detail.

As shown in FIG. 1, in the communication sheet 100, the substantially rectangular-shaped opening region 112 is provided in a center of the first conductor layer 110, and the mesh conductors 111 have been removed from in the opening region 112.

Figure 3A:
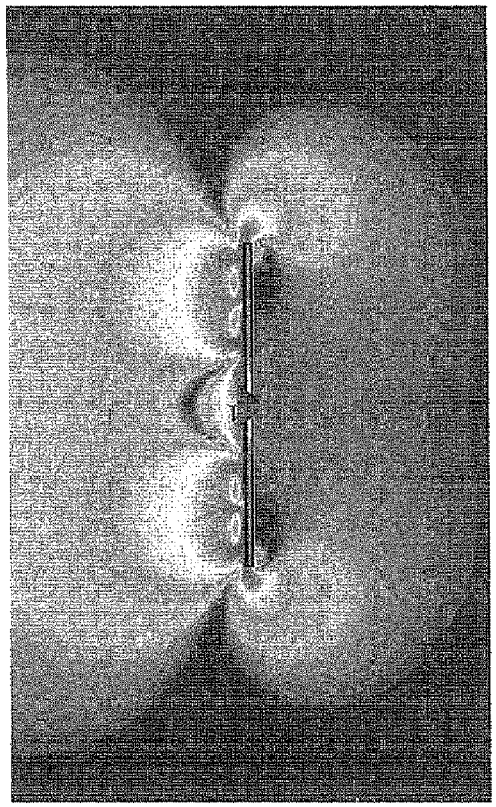
FIG. 3A is a distribution map of an electric field component Ez in a periphery of the communication sheet pertaining to the embodiment 1.
Figure 3B:
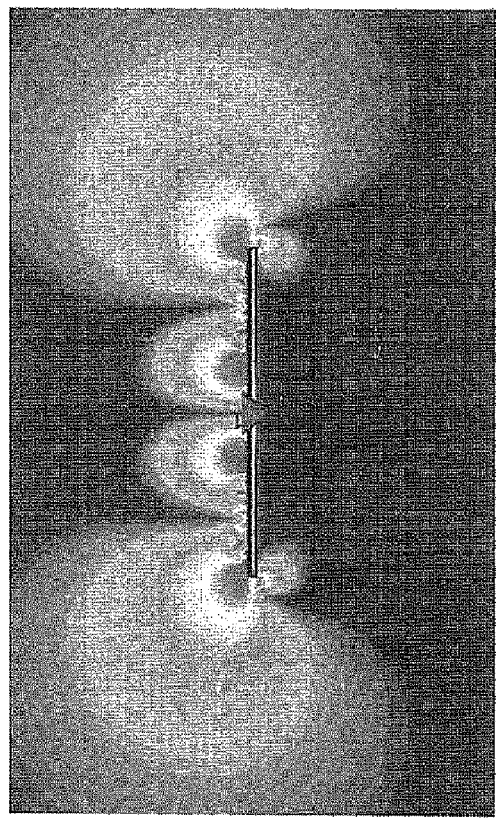
FIG. 3B is a distribution map of an electric field component Ey in the periphery of the communication sheet pertaining to the embodiment 1.

FIG. 3A is a map showing a simulation result of electric field distribution of the electric field component Ez in the z direction in a yz flat surface of a center in the longitudinal direction (x direction) of the communication sheet 100. In addition, FIG. 3B is a map showing a simulation result of electric field distribution of the electric field component Ey in the y direction in the yz flat surface of the center in the longitudinal direction (x direction) of the communication sheet. FIGS. 3A and 3B show that a whiter spot has a stronger field intensity, and a blacker spot has a weak field intensity. A deep-black spot indicates that the field intensity is very weak or does not exist.

As conditions for simulation, a size of the communication sheet 100 was set to be 800 mm by 100 mm, a material of the mesh conductors 111 (mesh electrodes) included in the first conductor layer 110 and a sheet conductor 131 (back electrode) included in the second conductor layer 130 was aluminum, and a material of the sheet-like dielectric substrate 121 included in the dielectric layer 120 was polyethylene foam with a thickness of 2 mm and a relative dielectric constant of 1.4. In addition, an electrode width was set to be 1 mm and a pitch was 7 mm as a mesh size of the first conductor layer 110, a size of the opening region 112 provided in the first conductor layer 110 was 600 mm by 30 mm, and the opening region 112 was installed so that the sheet center and an opening center became the same as each other. In addition, since an analysis frequency is 950 MHz, and the effective dielectric constant of the communication sheet 100 is 2.3, a sheet width (100 mm) of the communication sheet has a relation of $0.48\lambda$ to the effective wavelength $\lambda$.

Figure 15A:
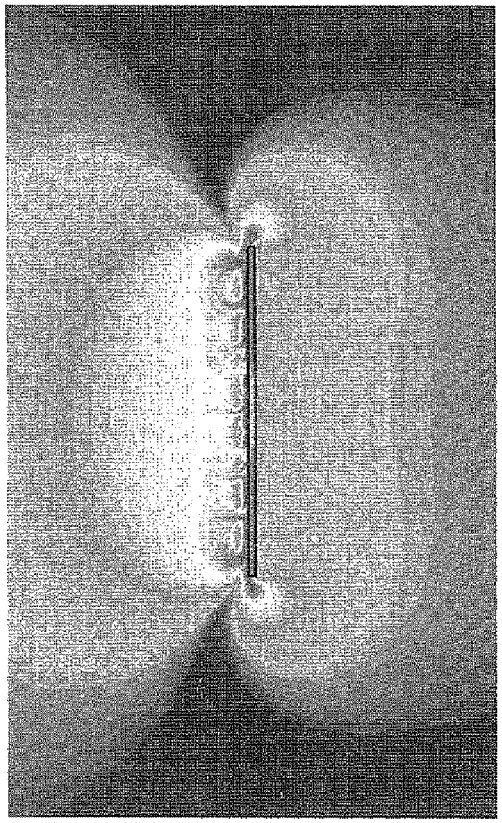
FIG. 15A is a distribution map of the electric field component Ez in a periphery of a communication sheet pertaining to background art.
Figure 15B:
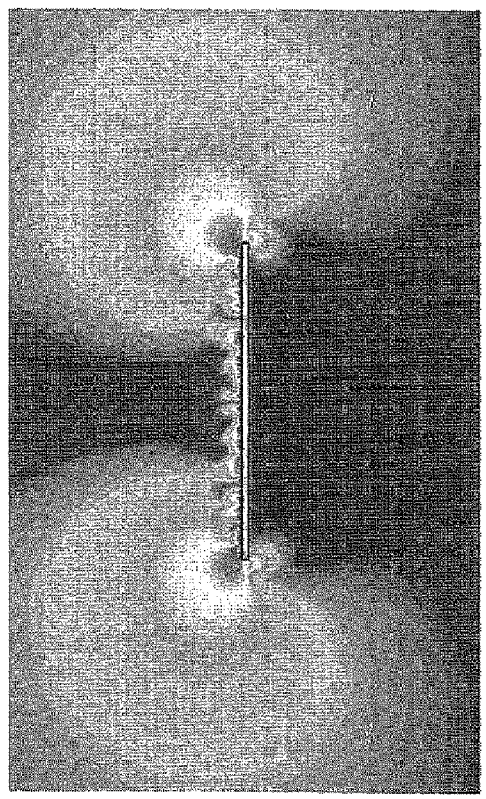
FIG. 15B is a distribution map of the electric field component Ez in the periphery of the communication sheet pertaining to the background art.

As can be seen from FIG. 3B, it turns out that as compared with a case shown in FIG. 15B, which is background art, an area above the center of the communication sheet 100, where the electric field component Ey is null, is reduced by providing the opening region 112 in the mesh sheet-like conductor in the first conductor layer 110, and that resistance to position deviation due to the rotation of the RF tag is generated.

Here, in the communication sheet 100, an opening region opposed to the above-described opening region 112 is not provided in the second conductor layer 130, which is a backside conductor surface. As described above, electromagnetic wave radiation in a back direction of the communication sheet 100 is suppressed by configuring the second conductor layer 130 with one closed conductive sheet without providing an opening region, and thus prevention of unnecessary electromagnetic wave leakage and unnecessary energy consumption is achieved.

Figure 4A:
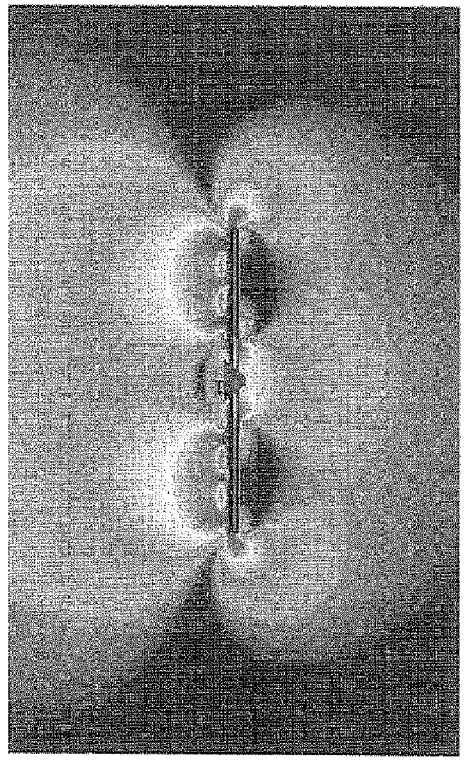
FIG. 4A is a distribution map of the electric field component Ez in a periphery of a communication sheet whose back surface has been hollowed.
Figure 4B:
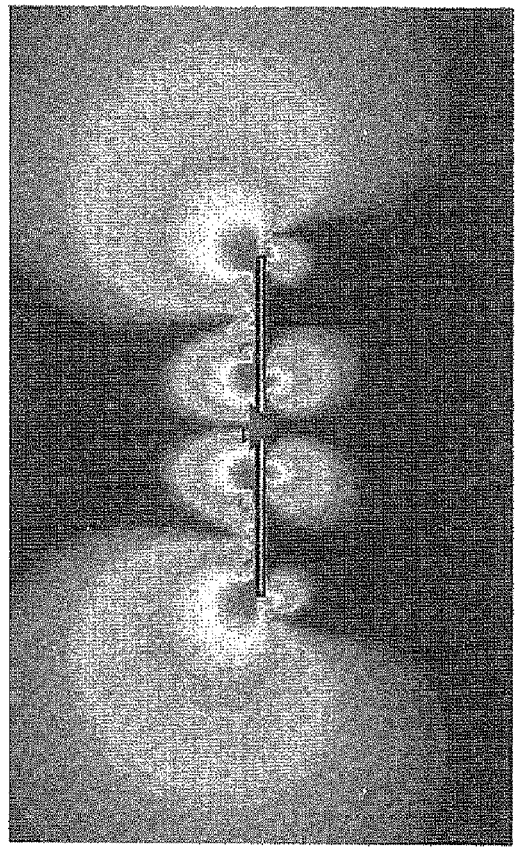
FIG. 4B is a distribution map of the electric field component Ey in the periphery of the communication sheet whose back surface has been hollowed.

In each of FIGS. 4A and 4B, as examples compared with the electric field distribution of FIGS. 3A and 3B, there is respectively shown the electric field distribution of the electric field components Ez and Ey in the yz flat surface at the center in the x direction of the communication sheet when an opening region is provided in the second conductor layer 130 in a form corresponding to the opening region 112 of the first conductor layer 110.

As is also seen from FIGS. 4A and 4B, as compared with the electric field distribution of FIGS. 3A and 3B, a large number of electromagnetic waves are radiated also in the back direction (i.e., in a direction of the second conductor layer 130) in the electric field distribution when the opening is provided in the form of hollowing a part of the communication sheet. Meanwhile, since the first conductor layer 130 is closed without being hollowed in the communication sheet 100 of the present application, the above-described unnecessary radiation can be suppressed.

Figure 5:
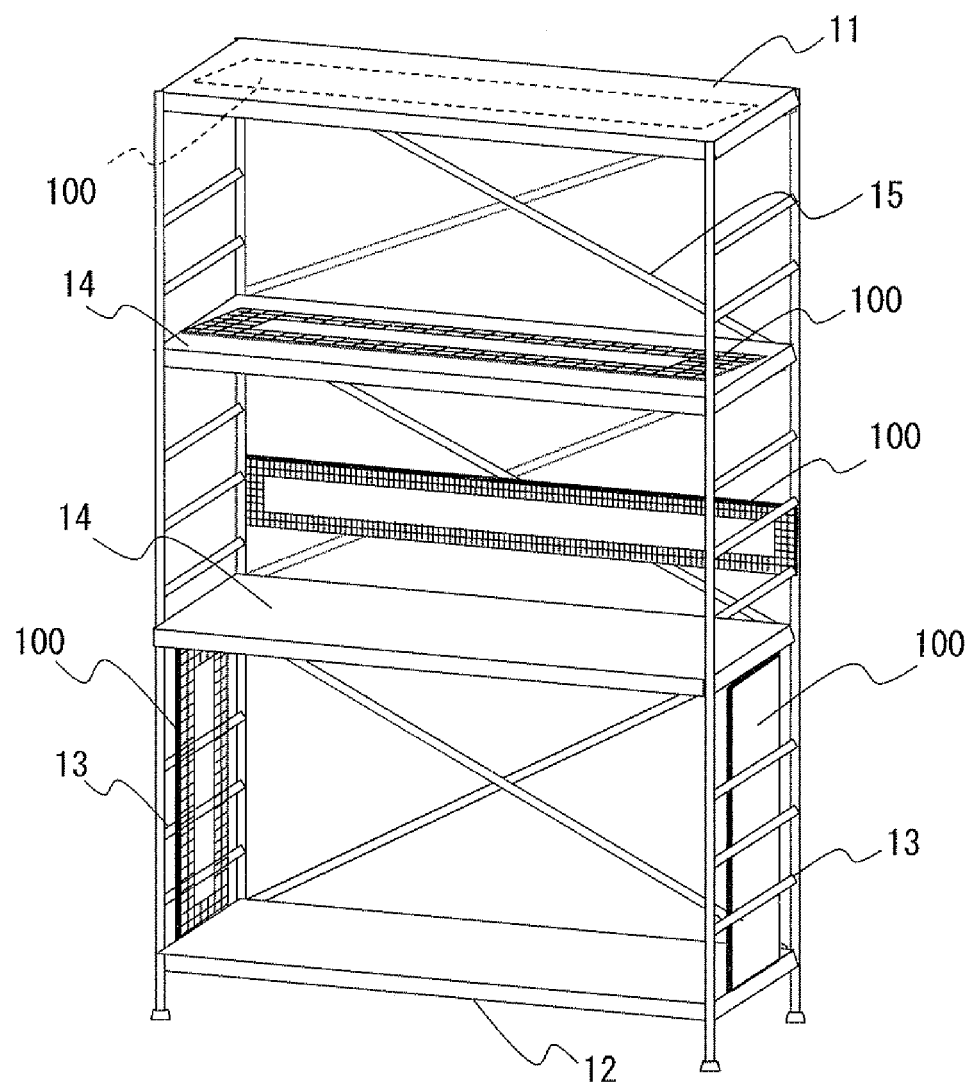
FIG. 5 is an external view of a smart shelf pertaining to the embodiment 1.

Next, one example of a communication system utilizing the communication sheet 100 will be explained. FIG. 5 is a view showing one example of a smart shelf 10 using the communication sheet 100. The smart shelf 10 is a display shelf provided with a function to manage merchandise, such as books and CDs. The smart shelf 10 includes: a top plate 11; a bottom plate 12; side plates 13; shelf plates 14, which are a plurality of partition plates; and a back plate 15 provided at a back surface of the smart shelf 10, and the communication sheet 100 is arranged in a plurality of spaces partitioned by shelf boards 14, respectively. As shown in FIG. 5, the communication sheet 100 is appropriately arranged at the top plate 11, the bottom plate 12, the side plates 13, the shelf plates 14, and the back plate 15, and books with RFID tags, etc. put in each space can be read through the communication sheet 100, thus enabling merchandise management etc. to be performed.

Here, as is seen from an arrangement example of the communication sheets shown in FIG. 5, radio wave radiation in the back direction from the communication sheets does not contribute to communication for actual RFID tag recognition, and thus unnecessary radio wave radiation is performed, also leading to a factor of false recognition of the RFID tags.

Meanwhile, since in the communication sheet 100 pertaining to the embodiment 1, the opening for preventing null is provided only in the first conductor layer 110, and the sheet conductor opposed to a mesh conductor portion that has been removed from the first conductor layer 110 is not removed from the second conductor layer 130, unnecessary radio wave radiation in the back direction is suppressed.

It is to be noted that when the smart shelf 10 is arranged so that two communication sheets 100 are opposed to each other as shown in FIG. 5, it can be expected to further improve accuracy of the RFID tag recognition. In addition, if the communication sheet 100 has a bendable configuration, it is preferable that in the smart shelf 10, the communication sheet 100 be arranged along the side plates 13 and the shelf plate 14, and that the communication sheet 100 be arranged along the side plates 13 and the back plate 15, since a range that can be covered by one communication sheet increases. Such a bendable communication sheet can be achieved by using a material having flexibility as a material included in each layer.

As described above, the communication sheet 100 pertaining to the embodiment 1 is configured to have stacked layers, the first conductor layer 110, the dielectric layer 120, and the second conductor layer 130. The first conductor layer 110 is the mesh sheet-like conductor, in which the mesh conductors in a portion of the first conductor layer 110 have been removed, and in which the opening region 112 has been provided. The second conductor layer 130 is the sheet-like conductor arranged opposed to the first conductor layer 110, and the sheet conductor in a region opposed to the mesh conductor portion removed from the first conductor layer 110 has not been removed. The dielectric layer 120 is a channel of an electromagnetic wave for communication, and is arranged to be sandwiched between the first conductor layer 110 and the second conductor layer 130. By employing the configuration, a null region of the Ey component above the communication sheet is reduced to make the communication sheet 100 have resistance to the position deviation due to the rotation of the RFID tag, and radiation of an unnecessary electromagnetic wave in the back direction is suppressed, whereby it becomes possible to achieve power saving and prevention of false recognition.

It is to be noted that as a size of the rectangular-shaped opening region 112 that is provided in the first conductor layer 110, the opening region 112 is, for example, preferably designed so as to be an opening where a length W in the sheet width direction (short-side direction) is the length of $1/20$ to $2/5$ of the sheet width of the communication sheet (dielectric substrate). By setting the length W to be the above-described one, electromagnetic wave radiation from edges of the opening region 112 is promoted, and the null region above the communication sheet can be reduced.

Figure 6:
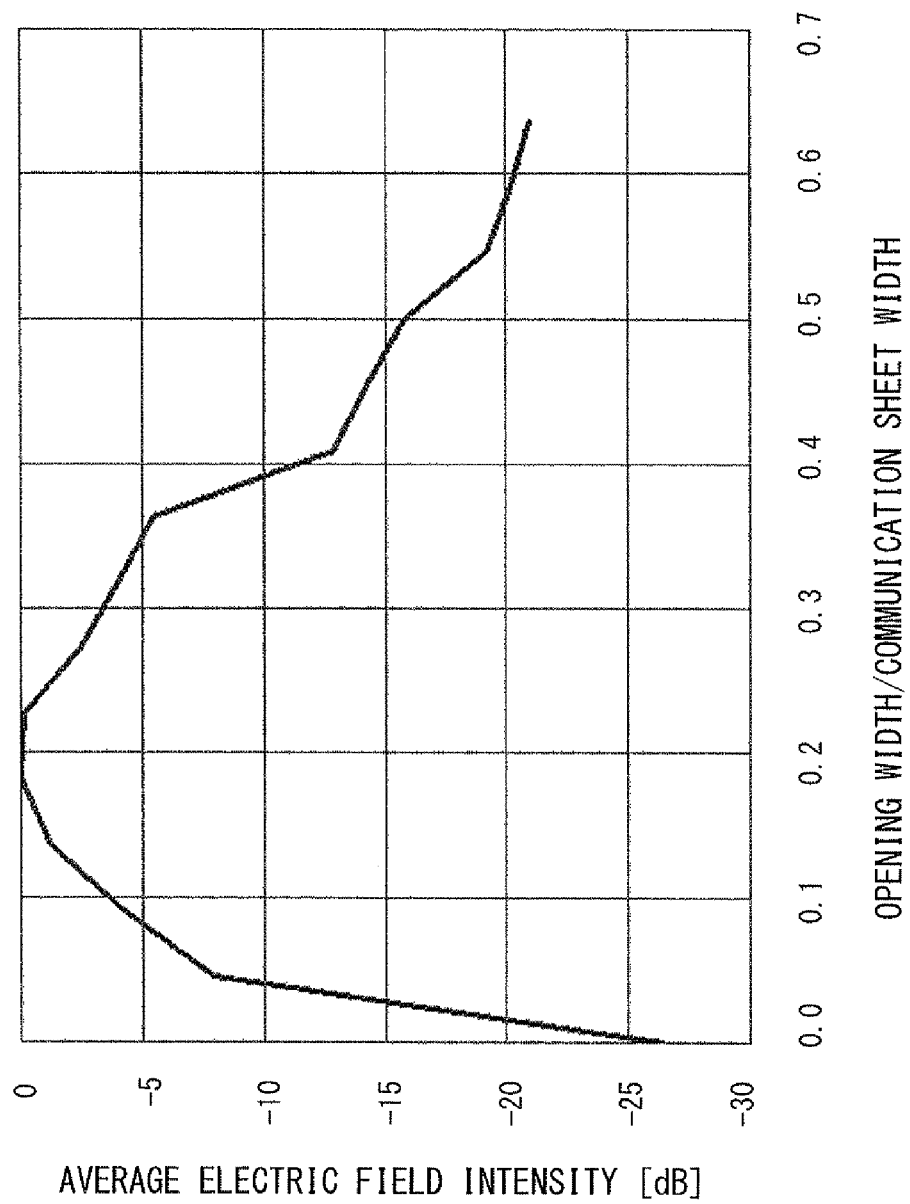
FIG. 6 is a graph showing an average intensity of the electric field component Ey above a communication sheet when a length in a sheet width direction of an opening region is changed.

FIG. 6 shows an average value of an Ey electric field intensity at a 6 mm upper position near a center in the sheet width direction (−10 mm to +10 mm) when the length W in the sheet width direction of the opening region is changed. As is seen from FIG. 6, an electric field intensity in which communication can be performed begins to be obtained from a point where the length W in the sheet width direction of the opening region exceeds $1/20$ length of the sheet width of the communication sheet, and this tendency continues until appropriately $2/5$ of the length. Here, particularly, a length not less than $1/10$ and not greater than $1/3$, which falls in a range from an optimum value to 5 dB, has a remarkable effect, and a length not less than $1/7$ and not greater than $1/4$ becomes substantially the same as the optimum value.

Figure 7:
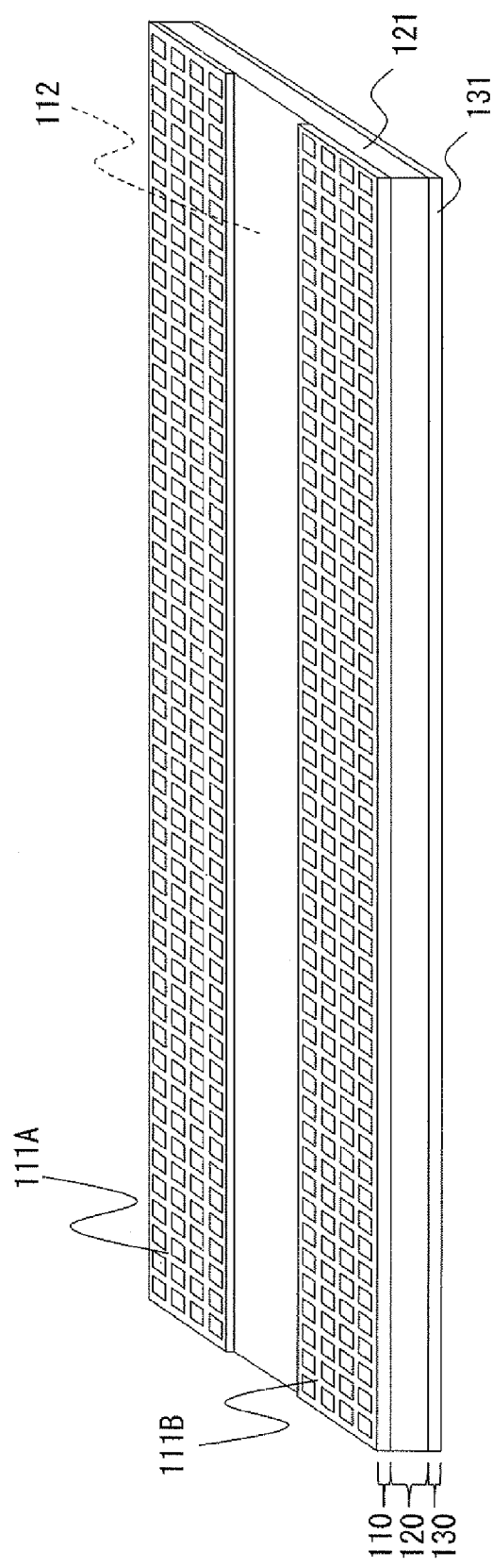
FIG. 7 is an external view of a communication sheet of another mode pertaining to the embodiment 1.

In addition, although in the above-described explanation, a case has been explained where a length L in a longitudinal direction of the opening region 112 is designed to be a length slightly shorter than the length in the longitudinal direction of the communication sheet 100, the present invention is not limited to this. As shown in FIG. 7, the length L in the longitudinal direction of the opening region 112 and the length in the longitudinal direction of the communication sheet 100 may be designed to be equal to each other. In this case, the first conductor layer 110 in the communication sheet 100 can include two separated mesh conductors of a first mesh sheet-like conductor 111A and a second mesh sheet-like conductor 111B. Here, the mesh conductor 111A and the mesh conductor 111B serve as mesh sheets whose width lengths in a short-side direction are shorter than a half of the length in the short-side direction of the communication sheet 100. Additionally, the mesh conductor 111A and the mesh conductor 111B are arranged along both sides in the longitudinal direction of the communication sheet 100, respectively, and thereby the opening region 112 is formed near the center of the communication sheet 100. The communication sheet 100 may be configured as described above.

In addition, although in the above-described explanation, a case has been explained where a center axis in the short-side direction of the opening region 112 and a center axis in the short-side direction of the communication sheet 100 (dielectric substrate 121) coincide with each other, and thereby the opening region 112 is provided in the center of the communication sheet 100, the present invention is not limited to this. The opening region 112 may be provided in a form where it is deviated in the short-side direction from the center of the communication sheet 100 by a predetermined distance.

Embodiment 2

Hereinafter, an embodiment 2 of the present invention will be explained with reference to the drawings. However, the explanation of portions which have already been explained in the embodiment 1 will be partially omitted for clarification of the invention.

Figure 8:
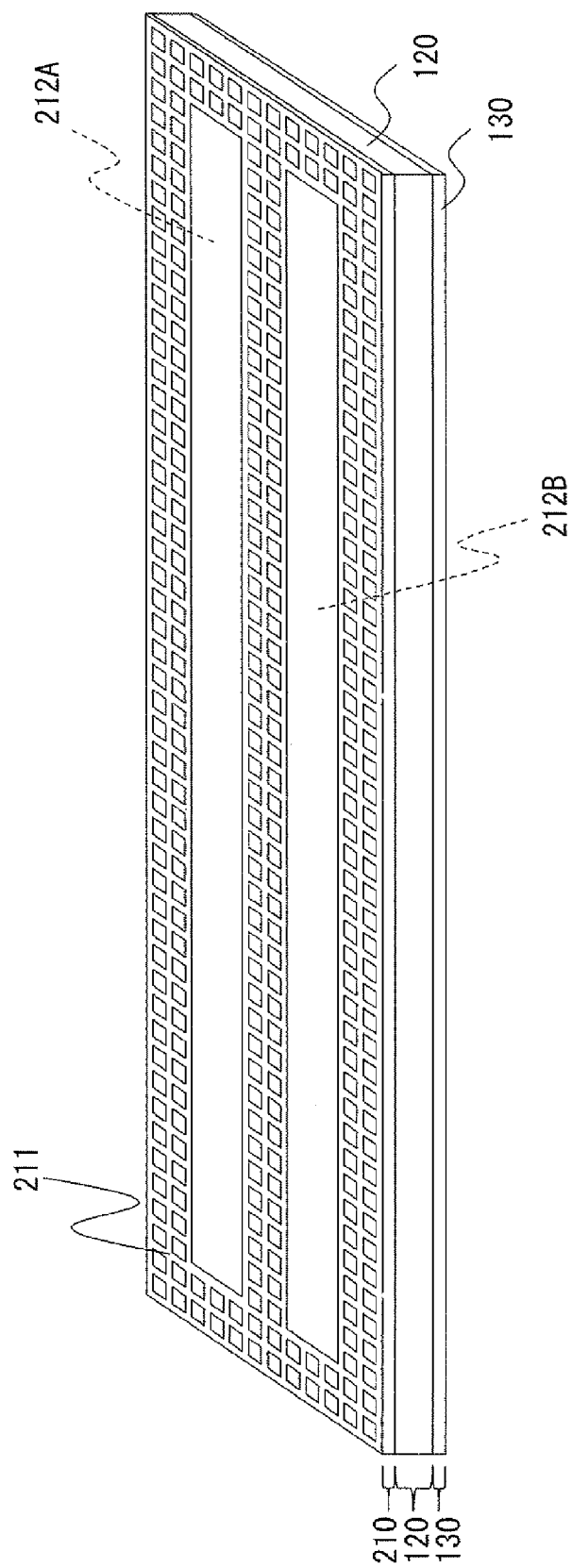
FIG. 8 is an external view of a communication sheet pertaining to an embodiment 2.

FIG. 8 is an external view of a communication sheet 200 pertaining to the embodiment 2. The communication sheet 200 is configured to have stacked layers, a first conductor layer 210, the dielectric layer 120, and the second conductor layer 130.

The first conductor layer 210 is a mesh sheet-like conductor, in which partial mesh conductors 211 have been removed, and in which two opening regions 212A and 212B have been provided. Each opening region has a substantially rectangular shape whose length in a sheet width direction is not less than $1/3$ and less than $1/2$ of a length in a sheet width direction of the communication sheet 200 (dielectric substrate 121). Two rectangular-shaped opening regions are arranged side by side in the sheet width direction, and thereby the number of edges of the opening regions on the communication sheet 200 is increased compared with that of the communication sheet 100 of the embodiment 1. Accordingly, a range covered by radiation of an electromagnetic wave radiated from the edge extends, and it becomes possible to further reduce a null region.

As described above, in the communication sheet 200, as opening regions provided in the first conductor layer 210, a plurality of opening regions are arranged in parallel in a short-side direction of the dielectric substrate 121, each of the opening regions having a rectangular shape whose length in the sheet width direction is set to be not less than $1/3$ and less than $1/2$ of the length in the sheet width direction of the dielectric substrate 121. By employing configuration, an area where the electric field components are null can be further reduced.

In this case as well, in view of a reduction effect of the null region, it is preferable to set the length in the sheet width direction of the opening region to be not less than $1/20$ and not greater than $2/5$ of the length in the sheet width direction of the dielectric substrate 121, particularly, a length not less than $1/10$ and not greater than $1/3$ has a remarkable effect, and a length not less than $1/7$ and not greater than $1/4$ is the most suitable width length.

Figure 9:
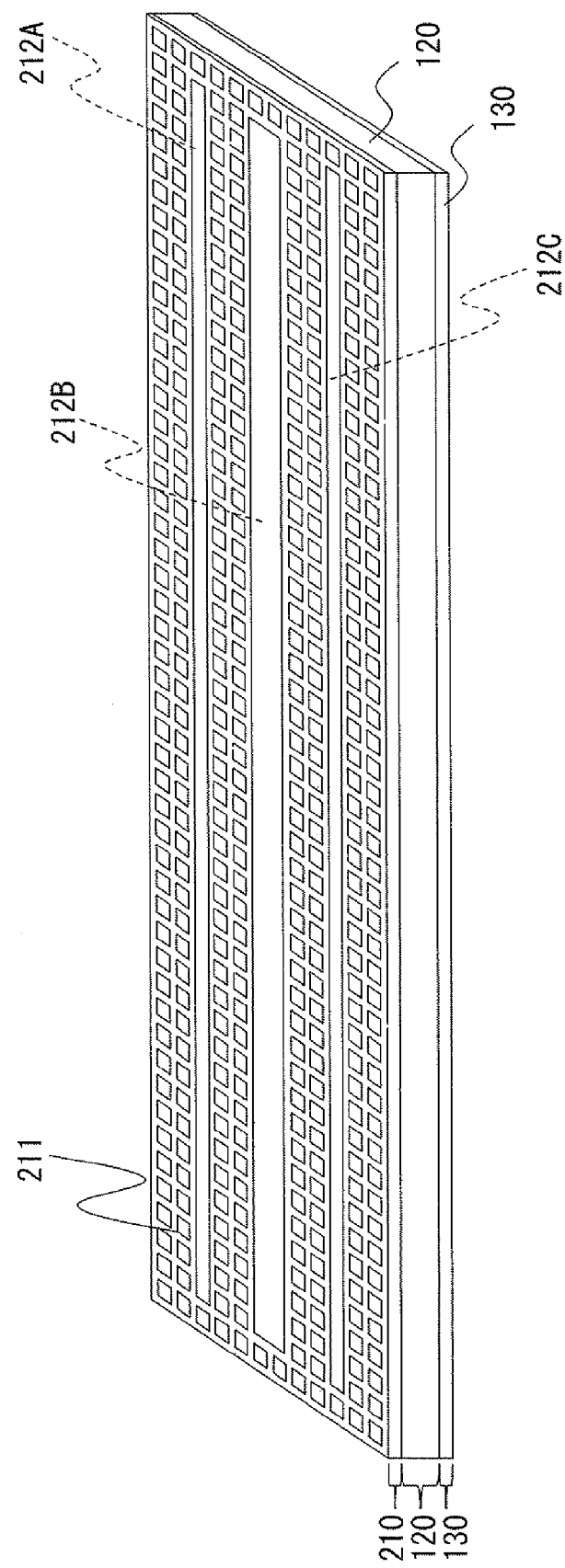
FIG. 9 is an external view of another form of a communication sheet pertaining to the embodiment 2.

It is to be noted that although in regard to the above-described communication sheet 200, a case has been explained where the first conductor layer 210 has two opening regions arranged in parallel, the present invention is not limited to this. As shown in FIG. 9, the mesh conductors 211 of the plurality of regions may be removed in the first conductor layer 210, and a plurality of opening regions 212A to 212C may be arranged in parallel in the short-side direction of the communication sheet (i.e., the direction perpendicular to the traveling direction of the electromagnetic wave). In this case, a length in a short-side direction of each opening region may be less than $1/3$ of the sheet width.

It is to be noted that in a plurality of rectangular-shaped opening regions arranged in parallel, the mesh conductors 211 may be removed so that a width length in the short-side direction differs for each opening region, or that the opening regions may have the same width length.

Embodiment 3

Hereinafter, an embodiment 3 of the present invention will be explained with reference to the drawings. However, the explanation of portions which have already been explained in the embodiments 1 and 2 will be partially omitted for clarification of the invention.

Figure 10:
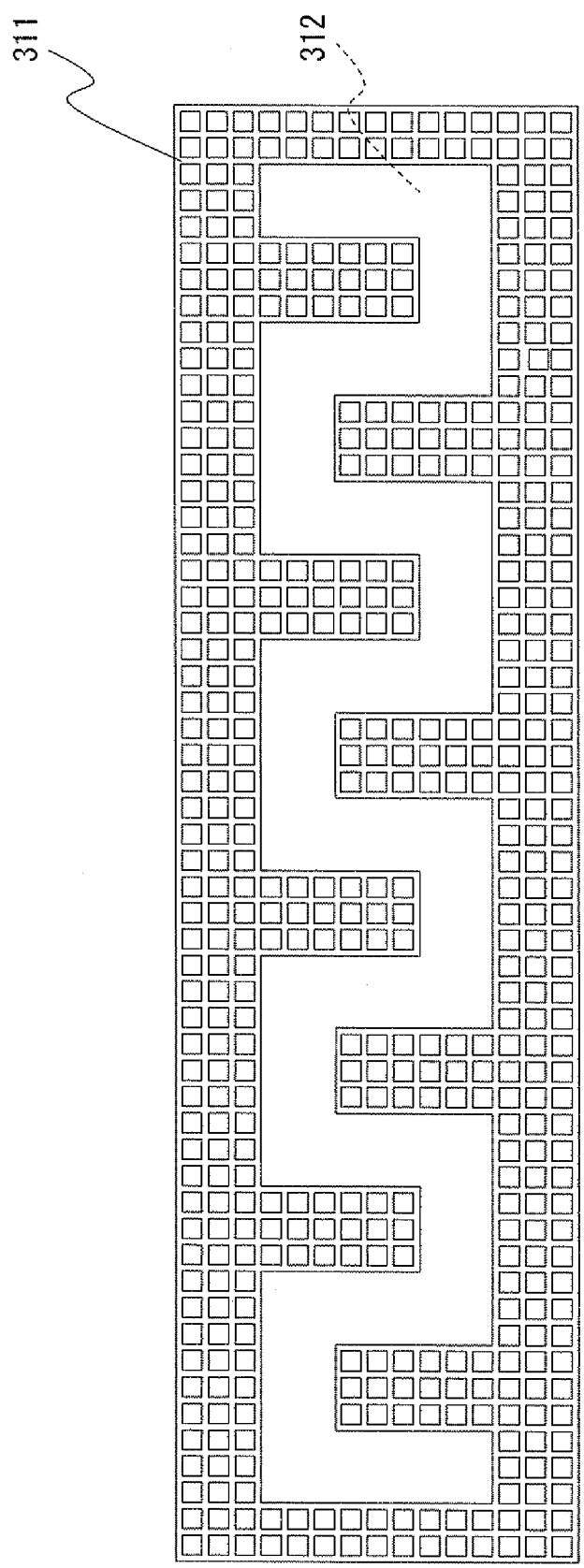
FIG. 10 is an external view of a communication sheet pertaining to an embodiment 3.

FIG. 10 is a plan view of a communication sheet 300 pertaining to the embodiment 3. As shown in FIG. 10, in the communication sheet 300, a meander-shaped opening region 312 is provided in a first conductor layer 310, and mesh conductors 311 have been removed in the opening region.

As is also seen from the electric field distribution of FIG. 3B, even though the opening region is provided in the mesh sheet-like conductor, a region where the electric field component becomes null slightly remains in a center of the opening region. Consequently, a region where the electric field component becomes null can be further reduced by making a shape of the opening region into a meander one.

Figure 11:
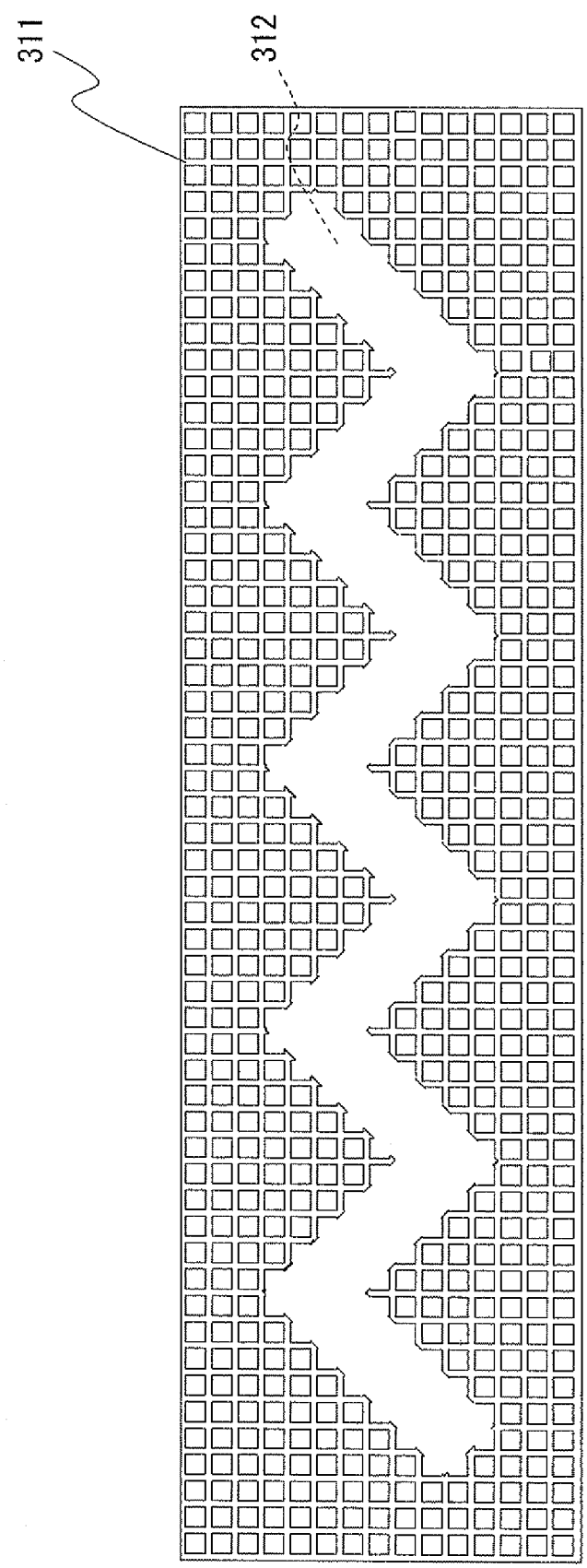
FIG. 11 is an external view of another form of a communication sheet pertaining to the embodiment 3.

It is to be noted that a shape of the meander-shaped opening region 312 provided in the first conductor layer 310 is not limited to the one shown in FIG. 10, and that as shown in FIG. 11, a meander-shaped opening region may be provided where a W-shaped (zigzag-shaped) opening has been provided. In addition, the number of meander-shaped opening regions is not limited to one, and a plurality of meander-shaped opening regions may be provided in parallel as in the embodiment 2. In addition to this, as the shape of the opening region, an S-shaped (wave-shaped) meander shape can be employed.

In addition, as also for the case of the meander-shaped opening region, a length in a sheet width direction is preferably a length not less than 1/20 and not greater than 2/5 of a length in the sheet width direction of the communication sheet (dielectric substrate), a length not less than 1/10 and not greater than 1/3 has a remarkable effect, and a length not less than 1/7 and not greater than 1/4 is particularly preferable since it is substantially the same as the optimum value.

Embodiment 4

Hereinafter, an embodiment 4 of the present invention will be explained with reference to the drawings. However, the explanation of portions which have already been explained in the embodiments 1 to 3 will be partially omitted for clarification of the invention.

Figure 12:
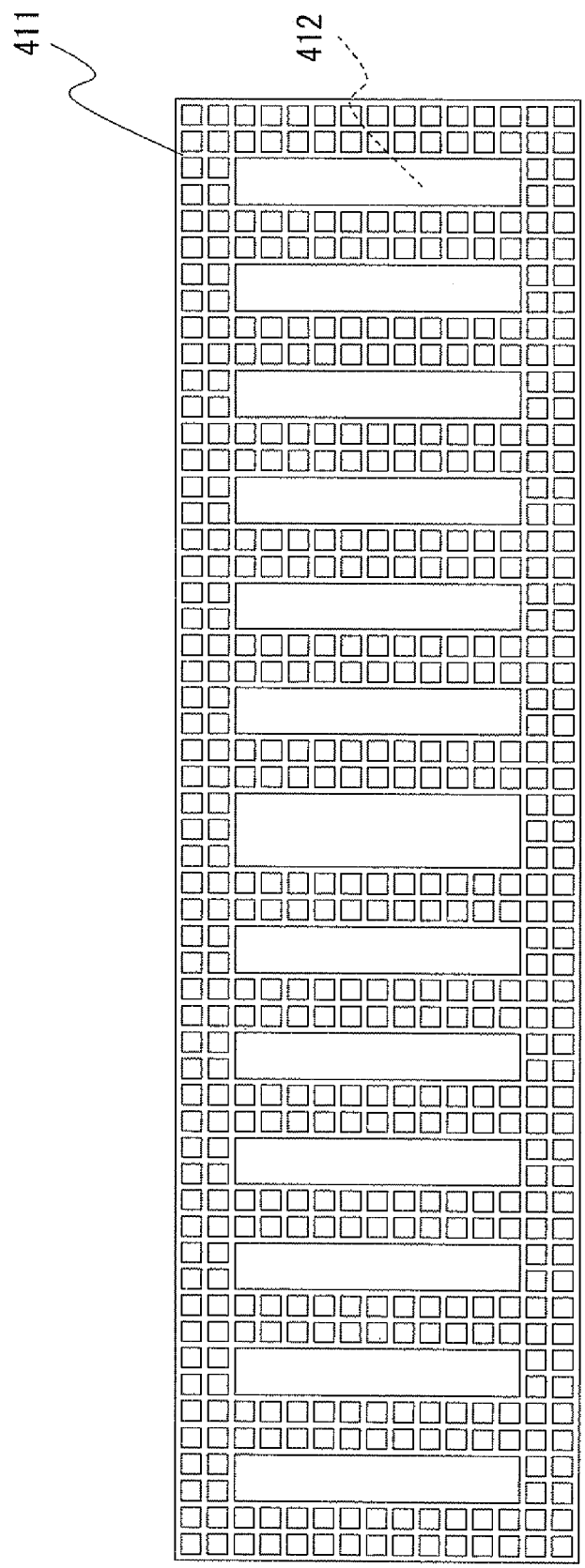
FIG. 12 is a top view of a communication sheet pertaining to an embodiment 4.

FIG. 12 is a plan view of a communication sheet 400 pertaining to the embodiment 4. As shown in FIG. 12, in the communication sheet 400, a plurality of opening regions 412 are provided in a first conductor layer 410, and mesh conductors 411 in the opening regions have been removed.

Here, the opening region 412 is characterized by being a rectangular-shaped opening region that has a longitudinal direction with respect to a short-side direction of the communication sheet 400 (dielectric substrate 121). A length in the longitudinal direction of each opening region is selected from lengths not less than 1/20 and not greater than 2/5 of the length of the dielectric substrate 121. Additionally, the plurality of opening regions having such shape are arranged in parallel in a longitudinal direction of the communication sheet 400. It is to be noted that in this case as well, the plurality of opening regions are preferably periodically arranged in parallel in the longitudinal direction of the dielectric substrate 121 at a predetermined interval, each of the opening regions having a substantially rectangular shape whose length in the longitudinal direction is set to be not less than 1/10 and not greater than 1/3 of the length in the short-side direction of the dielectric substrate 121, or further preferably not less than 1/7 and not greater than 1/4 thereof. The length and a periodic interval in the short-side direction of the opening region 412 preferably fall within a range of several millimeters to several centimeters in consideration of widths of managed books, CDs, etc.

As described above, in the communication sheet 400, as the opening regions provided in the first conductor layer 410, the plurality of opening regions are arranged in parallel in the longitudinal direction of the dielectric substrate 121, each of the opening regions having a rectangular shape whose length in the longitudinal direction is set to be not less than 1/20 and not greater than 2/5 of the length in the short-side direction of the dielectric substrate 121. Also by employing the configuration, a null area above a center of the communication sheet 400 can be reduced.

Embodiment 5

Hereinafter, an embodiment 5 of the present invention will be explained with reference to the drawings. However, the explanation of portions which have already been explained in the embodiments 1 to 4 will be partially omitted for clarification of the invention.

Figure 13:
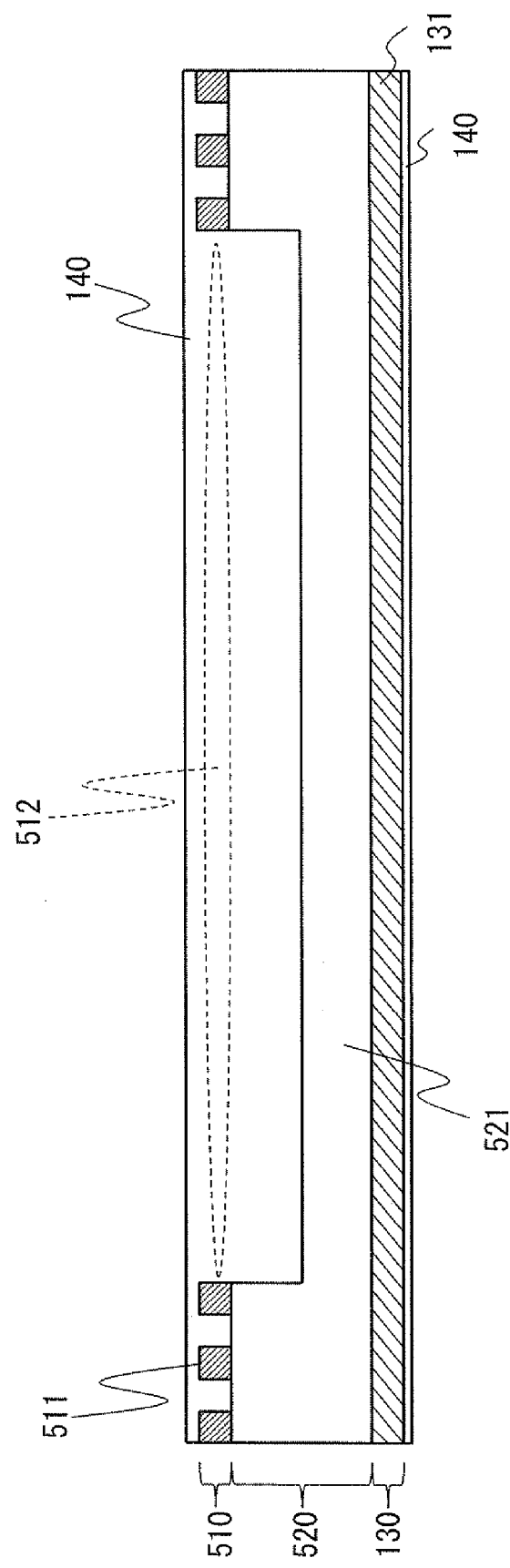
FIG. 13 is an xz cross-sectional view of a center portion of the communication sheet pertaining to an embodiment 5.

FIG. 13 is an xz cross-sectional view including an opening region 512 of a communication sheet 500 pertaining to the embodiment 5. The communication sheet 500, as explained in the above-described embodiments, has the opening region 512 where the mesh conductors 111 located in a portion of a mesh sheet-like conductor provided on a dielectric substrate 521 have been removed.

Here, in the communication sheet 500, the dielectric substrate 521 located at a position corresponding to the opening region 512 in the first conductor layer 510 is cut out and removed to a uniform depth. Accordingly, a cross section of the dielectric substrate has a concave shape in the xz cross-sectional view. In a final manufacturing process, since the communication sheet is covered with the protective film 140, the dielectric substrate 521 of the cut-out portion is filled with the protective film 140, and flatness of a surface of the communication sheet 500 is kept.

As described above, the communication sheet 500 is characterized in that dielectrics of a portion corresponding to the opening region 512 provided in the first conductor layer 510 are cut out. The communication sheet 500 can be configured as described above to improve the flexibility of the communication sheet, etc.

It is to be noted that as the depth of the dielectrics cut out at a lower part of the opening region of the mesh conductor, even all the dielectrics for a thickness of the dielectric substrate can be removed.

Hereinbefore, as explained in each embodiment, according to the communication sheet of the present invention, improvement in the recognition rate of the RFID tag can be achieved by improving the polarization characteristic while suppressing radiation of the unnecessary electromagnetic wave.

It is to be noted that although in the above-described explanation, the smart shelf has been explained as being the utilization mode of the communication sheet of the present invention, the present invention is not limited to this, and can be applied to other products and systems.

Figure 14:
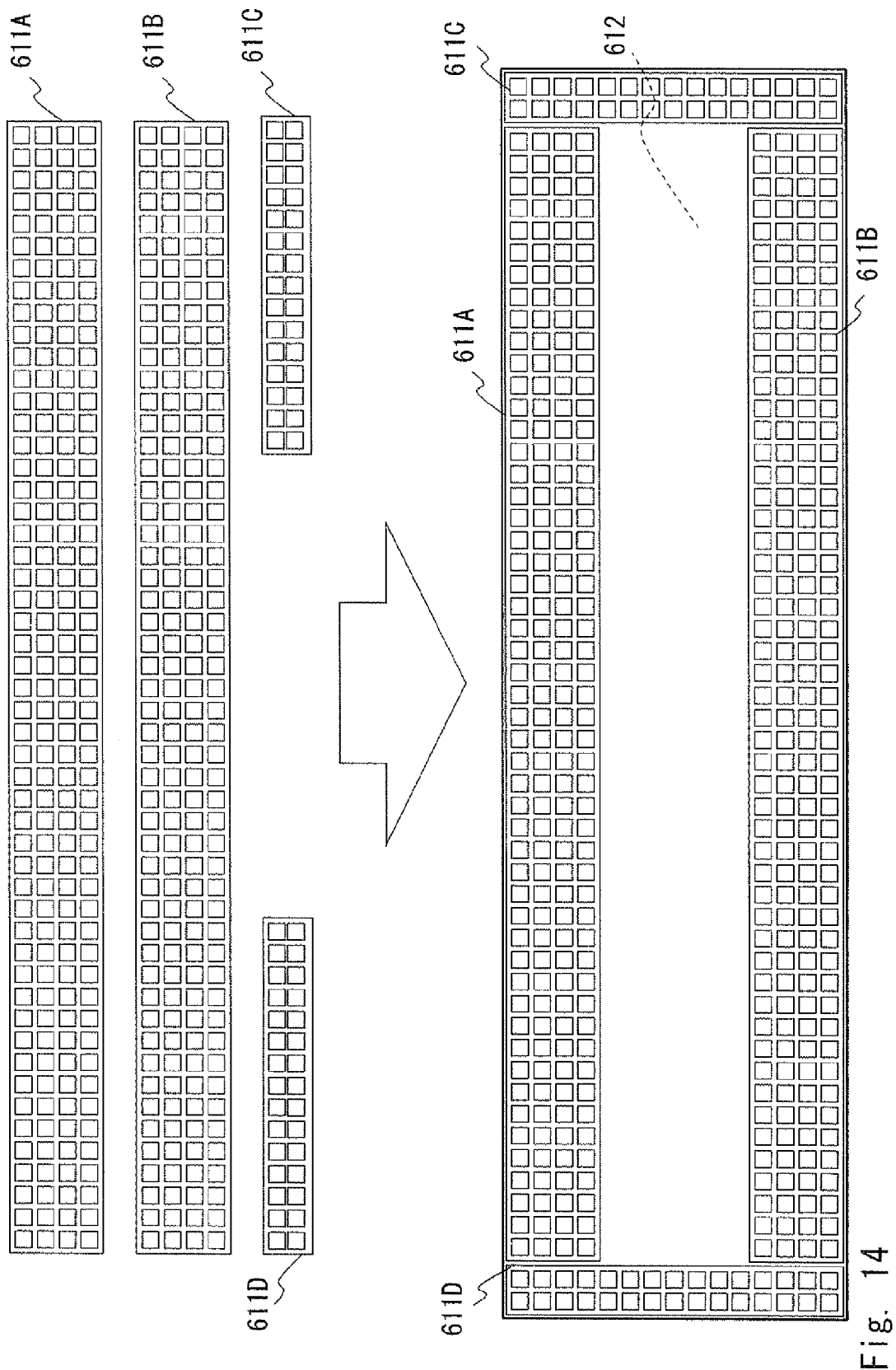
FIG. 14 is a view showing one example of a formation method of a first conductor layer.

In addition, although in the above-described explanation, the embodiments have been explained based on the case where the opening region(s) can be provided by cutting off and removing the mesh conductors of the partial region from the mesh sheet-like conductor, a formation method of the first conductor layer is not limited to this. For example, as shown in FIG. 14, mesh sheet-like conductors 611A to 611D, which are fragments of a mesh sheet-like conductor divided into four, are arranged side by side on the dielectric substrate, and thereby the opening region 512 may be provided. In this case as well, when a combined conductor obtained by combining mesh sheet-like conductors with each other is regarded as one mesh sheet-like conductor, it can be said that a portion of the mesh conductor has been removed, and that an opening region has been formed. Accordingly, it can be said that even a first conductor layer formed as described above is a conductor layer including a mesh sheet-like conductor arranged at one surface of the dielectric substrate, and is a conductor layer in which the opening region where the mesh conductors have been removed is provided. As described above, there exist, on the dielectric substrate, both a range covered with the mesh conductors and a range (opening region) without the mesh conductors, and a null area is reduced by an electromagnetic wave radiated from edge portions of the opening region.

It is to be noted that the present invention is not limited to the above-described embodiments, and that they can be appropriately changed without departing from the spirit of the invention. For example, the present invention can take the following modes.

APPENDIX 1

A communication sheet comprising:
a dielectric layer including a dielectric substrate;
a first conductor layer that is a conductor layer including a mesh sheet-like mesh conductor disposed on one surface of the dielectric substrate, wherein an opening region from where the mesh conductor is removed is formed; and
a second conductor layer that is a conductor layer including a sheet-like sheet conductor disposed on another surface of the dielectric substrate opposite to the first conductor layer, wherein the sheet conductor in a region opposite to the opening region from where the mesh conductor is removed is not removed.

APPENDIX 2

The communication sheet according to Appendix 1, wherein
the dielectric substrate is a substantially rectangular sheet-like substrate, and
a length in a short-side direction of the dielectric substrate is not less than ⅓ and not greater than ½ of an effective wavelength of an electromagnetic wave for communication that travels through the dielectric layer.

APPENDIX 3

The communication sheet according to Appendix 2, wherein as the opening region provided in the first conductor layer, an opening region is provided in a center in the short-side direction of the dielectric substrate, the opening region having a substantially rectangular shape whose length in a short-side direction is not less than 1/20 and not greater than ⅖ of the length in the short-side direction of the dielectric substrate.

APPENDIX 4

The communication sheet according to Appendix 2, wherein as the opening region provided in the first conductor layer, a plurality of opening regions are provided in parallel in the short-side direction of the dielectric substrate, each of the opening regions having a substantially rectangular shape whose length in a short-side direction is set to be not less than 1/20 and not greater than ⅖ of the length in the short-side direction of the dielectric substrate.

APPENDIX 5

The communication sheet according to Appendix 3 or 4, characterized in that the length in the short-side direction of the opening region is not less than 1/10 and not greater than ⅓ of the length in the short-side direction of the dielectric substrate.

APPENDIX 6

The communication sheet according to Appendix 5, characterized in that the length in the short-side direction of the opening region is not less than 1/7 and not greater than ¼ of the length in the short-side direction of the dielectric substrate.

APPENDIX 7

The communication sheet according to Appendix 2, wherein as the opening region provided in the first conductor layer, a plurality of opening regions are arranged in parallel in a longitudinal direction of the dielectric substrate, each of the opening regions having a substantially rectangular shape whose length in a longitudinal direction is set to be not less than 1/20 and not greater than ⅖ of the length in the short-side direction of the dielectric substrate.

APPENDIX 8

The communication sheet according to Appendix 1 or 2, wherein the opening region provided in the first conductor layer has a meander shape.

APPENDIX 9

The communication sheet according to any one of Appendices 1 to 6, wherein in the dielectric substrate, dielectrics of a portion corresponding to the opening region provided in the first conductor layer are cut out.

APPENDIX 10

A smart shelf, wherein two communication sheets according to any one of Appendices 1 to 7 are arranged opposed to each other.

APPENDIX 11

A smart shelf in which the bendable communication sheet according to any one of Appendices 1 to 7 is arranged along a shelf plate and side plates.

Hereinbefore, although the invention in the present application has been explained with reference to the embodiments, the invention in the present application is not limited by the above. Various changes that can be understood by those skilled in the art within the scope of the invention can be made to a configuration and details of the invention in the present application.

This application claims priority based on Japanese Patent Application No. 2011-265156 filed on Dec. 2, 2011, and the entire disclosure thereof is incorporated herein.

REFERENCE SIGNS LIST

10 Smart Shelf
11 Top Plate
12 Bottom Plate
13 Side Plate
14 Shelf Plate
15 Back Plate
100 Communication Sheet
110 First Conductor Layer 111 Mesh Conductor
112 Opening Region
120 Dielectric Layer
121 Dielectric Substrate
130 Second Conductor Layer
131 Sheet Conductor
140 Insulator Coating Film
210 First Conductor Layer
211 Mesh Conductor
212 Opening Region
311 Mesh Conductor
312 Opening Region
411 Mesh Conductor
412 Opening Region
510 First Conductor Layer
512 Opening Region
520 Dielectric Layer
521 Dielectric Substrate
611 Mesh Conductor

What is claimed is:

1. A communication sheet comprising:
a dielectric layer including a dielectric substrate;
a first conductor layer that is a conductor layer including a mesh sheet-like mesh conductor disposed on one surface of the dielectric substrate, wherein an opening region from where the mesh conductor is removed is formed; and
a second conductor layer that is a conductor layer including a sheet-like sheet conductor disposed on another surface of the dielectric substrate opposite to the first conductor layer, wherein the sheet conductor in a region opposite to the opening region from where the mesh conductor is removed is not removed, wherein
the dielectric substrate is a substantially rectangular sheet-like substrate,
a length in a short-side direction of the dielectric substrate is not less than 1/3 and not greater than 1/2 of an effective wavelength of an electromagnetic wave for communication that travels through the dielectric layer,
as the opening region provided in the first conductor layer, an opening region is provided in a center in the short-side direction of the dielectric substrate, the opening region having a substantially rectangular shape whose length in a short-side direction is not less than 1/20 and not greater than 2/5 of the length in the short-side direction of the dielectric substrate, and
the opening region is not penetrating from the first conductor layer to the second conductor layer.

2. The communication sheet according to claim 1, wherein the opening region provided in the first conductor layer has a meander shape.

3. The communication sheet according to claim 1, wherein in the dielectric substrate, dielectrics of a portion corresponding to the opening region provided in the first conductor layer are cut out.

4. A smart shelf, wherein two communication sheets according to claim 1 are arranged opposed to each other.

5. A communication sheet comprising:
a dielectric layer including a dielectric substrate;
a first conductor layer that is a conductor layer including a mesh sheet-like mesh conductor disposed on one surface of the dielectric substrate, wherein an opening region from where the mesh conductor is removed is formed; and
a second conductor layer that is a conductor layer including a sheet-like sheet conductor disposed on another surface of the dielectric substrate opposite to the first conductor layer, wherein the sheet conductor in a region opposite to the opening region from where the mesh conductor is removed is not removed, wherein
the dielectric substrate is a substantially rectangular sheet-like substrate,
a length in a short-side direction of the dielectric substrate is not less than 1/3 and not greater than 1/2 of an effective wavelength of an electromagnetic wave for communication that travels through the dielectric layer,
as the opening region provided in the first conductor layer, a plurality of opening regions are arranged in parallel in a longitudinal direction of the dielectric substrate, each of the opening regions having a substantially rectangular shape whose length in a longitudinal direction is set to be not less than 1/20 and not greater than 2/5 of the length in the short-side direction of the dielectric substrate, and
the opening region is not penetrating from the first conductor layer to the second conductor layer.

6. A communication sheet comprising:
a dielectric layer including a dielectric substrate;
a first conductor layer that is a conductor layer including a mesh sheet-like mesh conductor disposed on one surface of the dielectric substrate, wherein an opening region from where the mesh conductor is removed is formed; and
a second conductor layer that is a conductor layer including a sheet-like sheet conductor disposed on another surface of the dielectric substrate opposite to the first conductor layer, wherein the sheet conductor in a region opposite to the opening region from where the mesh conductor is removed is not removed, wherein
the dielectric substrate is a substantially rectangular sheet-like substrate,
a length in a short-side direction of the dielectric substrate is not less than 1/3 and not greater than 1/2 of an effective wavelength of an electromagnetic wave for communication that travels through the dielectric layer,
as the opening region provided in the first conductor layer, a plurality of opening regions are provided in parallel in the short-side direction of the dielectric substrate, each of the opening regions having a substantially rectangular shape whose length in a short-side direction is set to be not less than 1/20 and not greater than 2/5 of the length in the short-side direction of the dielectric substrate, and
the opening region is not penetrating from the first conductor layer to the second conductor layer.

* * * * *